United States Patent [19]

Riesmeier et al.

[11] Patent Number: 4,802,936
[45] Date of Patent: Feb. 7, 1989

[54] METHOD AND APPARATUS FOR TAPING NONSTRAIGHT WORKPIECE EDGE

[75] Inventors: Wilhelm Riesmeier, Lübbecke; Martin Rose, Espelkamp, both of Fed. Rep. of Germany

[73] Assignee: IMA-Norte Maschinenfabriken Klessmann GmbH & Co., Gütersloh, Fed. Rep. of Germany

[21] Appl. No.: 126,721

[22] Filed: Nov. 30, 1987

[51] Int. Cl.$^4$ ............................................. B65H 31/00
[52] U.S. Cl. ........................................ 156/64; 156/211; 156/353; 156/391; 156/522; 156/523
[58] Field of Search ............... 156/64, 353, 211, 202, 156/391, 226, 227, 216, 522, 574, 523, 577, 107, 109, 461, 212

[56] References Cited

U.S. PATENT DOCUMENTS

| | | |
|---|---|---|
| 2,713,437 | 7/1955 | Broden . |
| 3,574,040 | 4/1971 | Chitwood et al. .................. 156/522 |
| 3,733,237 | 5/1973 | Wolff ................................. 156/468 |
| 3,886,013 | 5/1975 | Bowser et al. ..................... 156/109 |
| 4,118,268 | 10/1978 | Price ................................. 156/510 |
| 4,155,798 | 5/1979 | Becker ............................. 156/216 X |
| 4,278,488 | 7/1981 | Kopacz ........................... 156/216 X |
| 4,486,261 | 12/1984 | Koller et al. ..................... 156/216 X |
| 4,588,463 | 5/1986 | Barber ............................. 156/216 X |
| 4,750,966 | 6/1988 | Koller ............................... 156/216 |

Primary Examiner—David Simmons
Attorney, Agent, or Firm—Charles E. Baxley

[57] ABSTRACT

A tape is adhered to a corner-defining nonstraight edge of a generally planar workpiece with an apparatus comprising a stationary workpiece station, clamps for retaining the workpiece in the station, a roller engageable with the workpiece and rotatable on the carriage about an axis generally perpendicular to the workpiece plane, and a supply of the tape and an adhesive on the carriage. The roller and workpiece are relatively displaced to roll the roller around the workpiece edge and over the corner thereof while pressing the tape with the roller against the workpiece edge and corner. The tape feed is automatically monitored to determine which portion of the tape will be pressed over the edge corner and a notch is cut in the tape at the portion to be pressed to the corner. Then this notched portion of the tape is pressed over the corner without overlapping the tape.

9 Claims, 2 Drawing Sheets

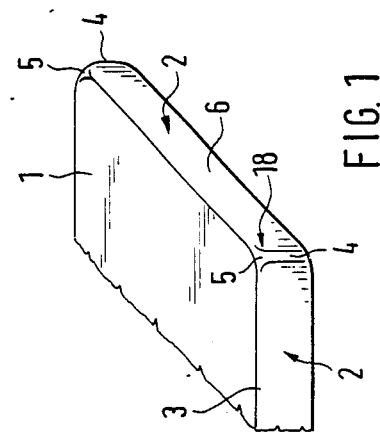
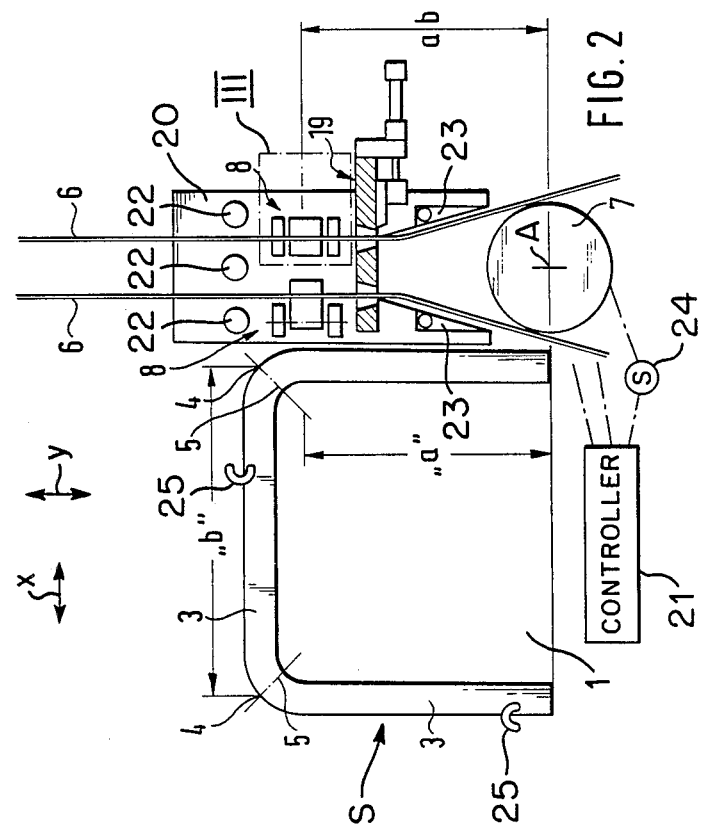

METHOD AND APPARATUS FOR TAPING NONSTRAIGHT WORKPIECE EDGE

FIELD OF THE INVENTION

The present invention relates to a method of and apparatus for adhering a tape to an irregular workpiece edge. More particularly this invention concerns a system for gluing a tape to the edge and around the corners of a laminate board.

BACKGROUND OF THE INVENTION

In the manufacture of furniture, cabinets, counters, and the like it is standard to adhere a decorative cover tape to the edge of a board. Frequently chipboard or the like is laminated on one of its broad faces with a decorative and/or protective covering or veneer and a tape of a similar such covering is then applied to the board edges to impart the same appearance or properties to them also. As a rule contact or thermally activatable adhesives are used to hold the tape on.

When the workpiece is a board with straight edges, this application of the tape to its edge is easily completed as the workpiece moves along an assembly line in a direction parallel to the edge being taped. The workpiece can be turned to similarly tape its remaining edges. When, however, the workpiece does not have straight edges the task is substantially more difficult.

A standard machine for dealing with such nonstraight edges has a small table to which the workpiece is clamped, normally with the main plane of the workpiece horizontal and the workpiece edges overhanging the table. This table can be rotated about a vertical axis passing through the workpiece. Adjacent the table is an arm having an outer end pivoted about another vertical axis and an inner end carrying a roller with the arm extendin generally tangentially of the workpiece. The arm is spring-loaded to press this roller radially inward of the table axis against the workpiece to press an adhesived tape against the workpiece edge while the workpiece rotates. Another such arm upstream in the workpiece rotation direction can carry a tool that mills, grinds, or otherwise machines the workpiece edge, typically to cut back the surface laminate level with the edge.

Such a machine cannot be operated readily by an numerical-type controller because relative to the workpiece that is fixed to the work station, a working plane must be set in which every point must be accessible in two directions. Since the starting position of the workpiece is not determinable and also because the roller arm oscillates, that is moves the roller through an arc intersecting the workpiece edge as the roller follows the workpiece edge, such a controller cannot be used due to the complexity of calculating location based on a nonstraight roller path intersecting an edge of an irregular figure rotating about an indeterminate center.

Another disadvantage of the known machines is that they only work on edges with sharp corners. At a sharp corner the tape can be cut and fitted accurately by automatic equipment, even mitered if necessary. A rounded edge, however, cannot be so simply dealt with, so that design desiderata, such as rounded freeform corners, must yield to the difficulty of laminating over them.

OBJECTS OF THE INVENTION

It is therefore an object of the present invention to provide an improved system for adhering a tape to a nonstraight workpiece edge.

Another object is the provision of a method of and apparatus for adhering a tape to a nonstraight workpiece edge which overcome the above-given disadvantages, and which in particular allows rounded edges and corners to be taped in an automatic machine.

SUMMARY OF THE INVENTION

A tape is adhered to a corner-defining nonstraight edge of a generally planar workpiece with an apparatus comprising a stationary workpiece station, clamps for retaining the workpiece in the station, a roller engageable with the workpiece and rotatable on the carriage about an axis generally perpendicular to the workpiece plane, and a supply of the tape and an adhesive on the carriage. According to the invention the roller and workpiece are relatively displaced to roll the roller around the workpiece edge and over the corner thereof while pressing the tape with the roller against the workpiece edge and corner. The tape feed is automatically monitored to determine which portion of the tape will be pressed over the edge corner and a notch is cut in the tape at the portion to be pressed to the corner. Then this notched portion of the tape is pressed over the corner without overlapping the tape.

It is therefore possible according to the invention to accurately laminate the rounded edges of a workpiece like a table top. In this manner a cheap but dimensionally stable material like chipboard can be cut to a rounded free-form shape and can then be accurately laminated so as to look like a solid piece of the material—wood veneer, synthetic-resin sheet, or the like—constituting the tape being applied to the edge.

According to this invention the supply includes two spools each carrying a respective such tape and the tapes are fed to diametrally opposite sides of the roller. The carriage The tape feed is automatically monitored to determine which portion of the tape will be pressed over the edge corner and a notch is cut in the tape at the portion to be pressed to the corner. Then this notched portion of the tape is pressed over the corner without overlapping the tape.

It is therefore possible according to the invention to accurately laminate is moved in two passes on opposite sides against the edge and the roller is urged oppositely on each pass so that with one pass one of the tapes is applied to the respective portion of the workpiece edge and with the next pass the other tape is applied to the opposite portion.

The notches according to the invention are formed in the edge of the tape and taper inward therefrom. In addition after applying the portion of the tape to the edge it is automatically cut off.

In the apparatus according to this invention the punching means includes a die through which the punch is engageable. This die is stationary and formed with a notch-forming recess and the punch is pivotal between a position engaged through the tape in the recess and a position spaced from the tape and recess.

DESCRIPTION OF THE DRAWING

The above and other objects, features, and advantages will become more apparent from the following, reference being made to the accompanying drawing in which:

FIG. 1 is a perspective view of the corner of a taped workpiece according to this invention;

FIG. 2 is a partly diagrammatic top view of the taping apparatus according to this invention;

SPECIFIC DESCRIPTION

Figure 4:
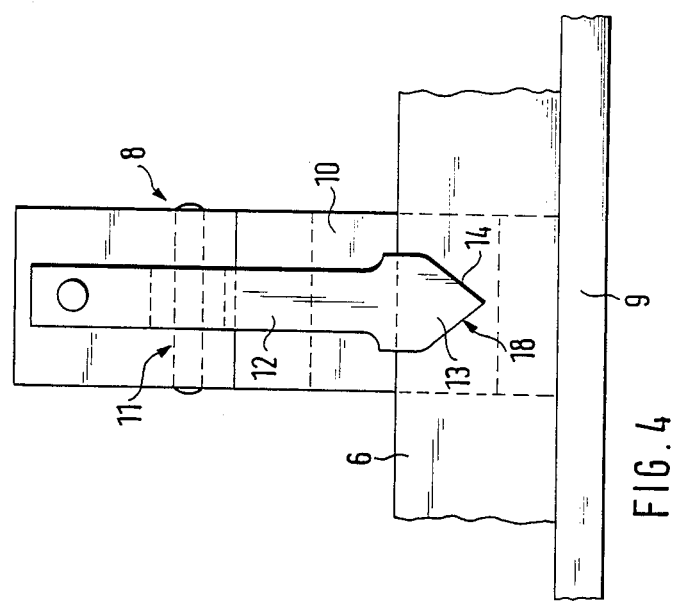
FIG. 4 is a side view taken in the direction of arrow IV of FIG. 3.

As seen in FIG. 1 a workpiece 1 according to this invention has an edge 2 which is rounded over at 3 like a quarter-cylinder to merge tangentially smoothly into the edge 3 and into the planar upper face of the workpiece 1. In addition the edge 4 defines similarly quarter-cylindrical corners 4 that are also rounded over at 5. According to this invention a tape 6 is glued to this edge 3, conforming to the rounded portion 3 and extending around the corners 4. As will be described below the tape 6 is formed with notches 18 that are applied at the corner regions 5 so as to form a continuous surface without overlapping or buckling of the tape 6.

As seen in FIG. 2 the apparatus of this invention has an edging roller 7 rotatable about an upright axis A and carried as described in my copending and jointly filed patent application Ser. No. 141,842, filed Jan. 11, 1988, on a carriage 20 adjacent a work station S in which a workpiece 1 is held by clamps 25. This roller 7 can move in the horizontal longitudinal direction x and in a horizontal transverse direction y perpendicular thereto to track around the workpiece edge 2. It is also possible to make the carriage 20 vertically displaceable to accommodate workpieces 1 of different thicknesses. Movement of the carriage 20 is controlled by a numeric controller 21 provided with appropriate servomotors.

The roller 7 is mounted on the carriage 20 for limited movement in the directions x and y with, however, the roller axis A always perfectly perpendicular to a horizontal plane defined by these directions x and y. The carriage 7 also carries a pair of supply spools rotatable about vertically spaced axes extending in the direction x and carrying respective tapes 6 that are to be glued to the edge 2 of the workpiece 1. The carriage 7 carries three upright guide rollers 22 between which the two tapes 6 are twisted so as to lie in vertical planes and extending mainly in the direction y thereafter to where they tangent diametrically opposite sides of the roller 7. Between the deflecting guide rollers 22 and the roller 7 each tape 6 passes first through a notching device 8, then through a cutter 19, and finally over a blower-type heater 23.

Figure 3:
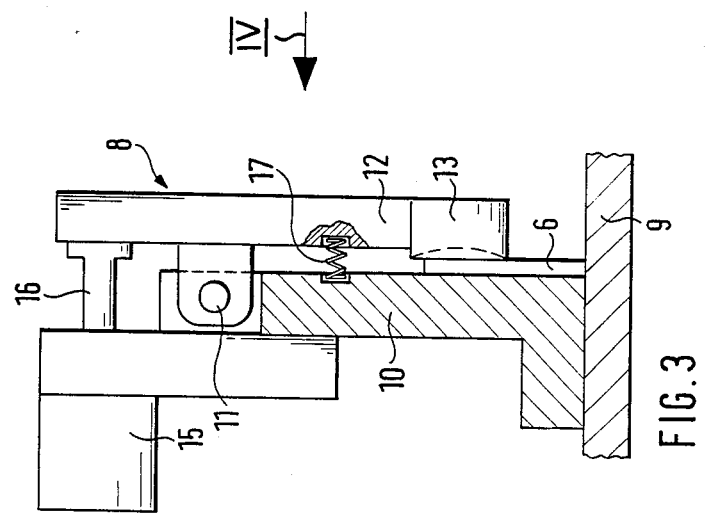
FIG. 3 is a large-scale sectional view of the detail indicated in the dot-dash box III of FIG. 5.

The notching device 8 as shown in FIGS. 3 and 4 comprises a die 10 mounted on the base plate 9 of the carriage 20 and formed with a hole 14 into which can enter the head 14 of a rocker/punch 12 operable by the armature 16 of an actuator 15 itself operated by the controller 21 as will be described below. The punch 12 is first-class lever with a central pivot 11, the armature 16 engaging its one end, and its other end urged out of the opening 14 by a spring 17 and carrying the punch head 13. The tapes 6 pass between the punch head 14 and die 10 such that a triangular notch 18 can be cut out of them. These notches 18 are positioned in the tapes 10 and/or 11 such that as shown in FIG. 16 when the tape 6 is applied to the workpiece edge 2 the notches 18 will be able to close at the rounded corners 5. Otherwise the tape 6 would bunch up at these locations.

The heaters 23 heat a layer of thermally activatable adhesive carried on the tapes 6. To this end these heaters 23 heat the faces of the tapes 6 that are turned away from the roller 7 and do not engage same, and it is of course these faces that carry the adhesive, so that the roller 7 is not fouled and does not stick to them.

The controller 21 also monitors how much of the tapes 6 is fed out, for instance by tracking the angular position of the roller 7 by means of a counter, tachometer, or other sensor shown schematically at 24 in FIG. 2. The controller 21 first moves the carriage 20 such that the roller 7 is at the near right-hand corner of the workpiece 1, with the tape 6 pressed against its edge 2. The roller 7 then is moved away and back to track around the nonstraight edge 2 and press the tape 6 against and in fact adhering it to this edge 2. The cutter 28 is operated at the appropriate instant to sever the tape 6 so that it also ends at the end of the edge being taped.

When the workpiece 1 is rectangular with rounded corners 5 as shown in FIG. 2 the distances a and b between the centers of adjacent ends and/or corners are stored in the controller 21 which actuates the punch 8 accordingly to form the notches 18. In addition the tapes 6 are payed out such that they fall just at these corners. In this arrangement it would be possible to work with a single tape which would be wound all around the workpiece 1, if desired.

We claim:

1. A method of adhering a tape to a corner-defining nonstraight edge of a generally planar workpiece with an apparatus comprising:

a stationary workpiece station;

means for retaining the workpiece in the station;

a roller engageable with the workpiece and rotatable on the carriage about an axis generally perpendicular to the workpiece plane; and a supply of the tape and an adhesive on the carriage; the method comprising the steps of:

relatively displacing the roller and workpiece and thereby rolling the roller around the workpiece edge and over the corner thereof while pressing the tape with the roller against the workpiece edge and corner;

automatically monitoring the tape feed and determining which portion of the tape will be pressed over the edge corner;

cutting a notch in the tape at the portion to be pressed to the corner; and pressing the notched portion of the tape over the corner without overlapping the tape.

2. The method defined in claim 1 wherein the supply includes two spools each carrying a respective such tape and the tapes are fed to diametrally opposite sides of the roller, the carriage being displaced in two passes on opposite sides against the edge and the roller is urged oppositely on each pass so that with one pass one of the tapes is applied to the respective portion of the workpiece edge and with the next pass the other tap is applied to the opposite portion.

3. The method defined in claim 1 wherein the notches are formed in the edge of the tape and taper inward therefrom.

4. The method defined in claim 1, further comprising the step of cutting off the portion of the tape applied to the edge.

5. An apparatus for adhering a tape to a corner-defining nonstraight edge of a generally planar workpiece, the apparatus comprising:
- a stationary workpiece station;
- means for retaining the workpiece in the station;
- a roller engageable with the workpiece and rotatable on the carriage about an axis generally perpendicular to the workpiece plane;
- a supply of the tape and an adhesive on the carriage;
- control means for automatically monitoring the tape feed and determining which portion of the tape will be pressed over the edge corner;
- means including a punch for cutting a notch in the tape at the portion to be pressed to the corner; and
- means for relatively displacing the roller and workpiece and thereby rolling the roller around the workpiece edge and over the corner thereof while pressing the tape with the roller against the workpiece edge and corner and flattening the tape at the notches over the corners without overlapping the tape.

6. The apparatus defined in claim 5 wherein the supply includes two spools each carrying a respective such tape and the tapes are fed to diametrally opposite sides of the roller, the carriage being displaced in two passes on opposite sides against the edge and the roller is urged oppositely on each pass so that with one pass one of the tapes is applied to the respective portion of the workpiece edge and with the next pass the other tape is applied to the opposite portion.

7. The apparatus defined in claim 5, further comprising
- means on the carriage between the supply and the roller for cutting the tape.

8. The apparatus defined in claim 5 wherein the punching means includes a die through which the punch is engageable.

9. The apparatus defined in claim 8 wherein the die is stationary and formed with a notch-forming recess and the punch is pivotal between a position engaged through the tape in the recess and a position spaced from the tape and recess.

* * * * *